United States Patent [19]

McAlister et al.

[11] Patent Number: 4,576,813

[45] Date of Patent: Mar. 18, 1986

[54] HEAT RECOVERY FROM CONCENTRATED SULFURIC ACID

[75] Inventors: Donald R. McAlister, Ballwin, Mo.; Steven A. Ziebold, Waterloo, Ill.

[73] Assignee: Monsanto Company, St. Louis, Mo.

[21] Appl. No.: 510,527

[22] Filed: Jul. 5, 1983

[51] Int. Cl.⁴ .................. C01B 17/98; C01B 17/74; C01B 17/48; C22C 38/40

[52] U.S. Cl. ................... 423/522; 423/531; 423/532; 422/160; 422/161; 148/37; 148/38

[58] Field of Search .............. 423/522, 533, 531, 532; 422/160, 161; 148/37, 38

[56] References Cited

U.S. PATENT DOCUMENTS

| | | | |
|---|---|---|---|
| 2,071,598 | 2/1937 | Von Girscwald | 423/522 |
| 2,199,691 | 5/1940 | Carter | 422/161 |
| 3,525,586 | 4/1970 | Drechsel et al. | 423/522 |
| 3,649,187 | 3/1972 | Fisher | 423/522 |
| 3,656,900 | 4/1972 | Drechsel et al. | 423/522 |
| 3,788,043 | 1/1974 | Dorr et al. | 423/522 |
| 3,950,493 | 4/1976 | Dorr et al. | 423/522 |
| 4,123,107 | 10/1978 | Bryant, Jr. et al. | 423/522 |
| 4,330,364 | 5/1982 | Blumrich et al. | 423/531 |
| 4,368,183 | 1/1983 | Dorr et al. | 423/522 |

FOREIGN PATENT DOCUMENTS

| | | | |
|---|---|---|---|
| 1139818 | 11/1962 | Fed. Rep. of Germany | 423/522 |
| 2529709 | 1/1977 | Fed. Rep. of Germany | 423/522 |
| 3018664 | 12/1980 | Fed. Rep. of Germany | 423/529 |
| 1385698 | 12/1963 | France | 423/522 |
| 471653 | 9/1937 | United Kingdom | 423/522 |
| 687160 | 2/1953 | United Kingdom | 423/522 |
| 1128435 | 9/1968 | United Kingdom | 423/531 |
| 1152385 | 5/1969 | United Kingdom | 423/522 |
| 1280624 | 7/1972 | United Kingdom | 423/531 |
| 1553307 | 9/1979 | United Kingdom | |
| 1589945 | 5/1981 | United Kingdom | |

OTHER PUBLICATIONS

Clayton, Jr. et al., Engineering Materials for Pumps & Valves, CEP, Sep. 78, pp. 54–57.
Sander, Waste Heat Recovery in Sulfuric Acid Plants, CEP, Mar. 77, pp. 61–64.
Browder, Improvements in Sulfuric Acid Processes, CEP, Mar. 77, pp. 70–76.
Sander et al., Concentration of Dilute Sulfuric Acid and Phosphoric Acid with Waste Heat, Proceeding of British Sulfur Corporation, 5th International Conference, Part II, London 1981, pp. 440–458.
Michels et al., How to Rate Alloys for $SO_2$ Scrubbers, Chemical Engineering, Jun. 1978, pp. 161–166.
David W. McDowell, "Handling of Sulfuric Acid," Chemical Engineering, Nov. 11, 1974.
Brink et al., "Mist Eliminators for Sulfuric Acid Plants," CEP Manual, A.I.Ch.E., New York (1971).
Cabat Corporation Bulletin, "Corrosion Resistance of Hastelloy Alloys," 1980.
E–Brite Alloy Bulletin, Allegheny Ludlum (1980).
J. M. Viebrick, "Corrosion of Type 304 Stainless Steel in Mixed Anhydrous Nitric and Sulfuric Acids," Corrosion, vol. 25, No. 9, pp. 371–378 (Sep. 1969).
Diagram, "Ferralium Alloy 255 Bulletin," Cabat Wrought Products Division (1983).
Fasullo, "Use and Handling of Sulfuric Acid," (McGraw–Hill 1965), p. 67.
International Nickel Company Corrosion Engineering Bulletin CEB–1 (Jan. 1983), title page and pp. 20, 25, 26, 28, 30, 32, 33, 35–41, 48, 49, 51–55, 85 and 86.
E–Brite 26–1 Bulletin, Airco Vacuum Metals Company (1975).
Swandby Corrosion Charts: Guides to Materials Selection, R. K. Swandby, Chemical Engineering, 186–201, Nov. 12, 1962.

*Primary Examiner*—Gary P. Straub
*Attorney, Agent, or Firm*—Lawrence L. Limpus; John K. Roedel, Jr.

[57] ABSTRACT

A method and apparatus for the recovery of heat from a sulfuric acid process are provided. Sulfuric trioxide is absorbed into hot concentrated sulfuric acid, acid having a concentration greater than 98% and less than 101% and a temperature greater than 120° C., in a heat recovery tower and the heat created by the exothermic reaction is recovered in a useful form in a heat exchanger.

49 Claims, 4 Drawing Figures

HEAT RECOVERY FROM CONCENTRATED SULFURIC ACID

BACKGROUND OF THE INVENTION

This invention relates to a process for the recovery of heat from a sulfuric acid plant. More particularly, this invention relates to a process for the recovery of the exothermic heat resulting from the absorption of sulfur trioxide into concentrated sulfuric acid. This invention also relates to a heat recovery tower which is used to recover the heat energy from concentrated sulfuric acid.

DESCRIPTION OF THE PRIOR ART

The process for the manufacture of sulfuric acid starts with a gas stream which contains sulfur dioxide. The sulfur dioxide is catalytically oxidized in a converter to sulfur trioxide which is removed from the gas stream in one or more absorption stages to form sulfuric acid. The oxidation of sulfur dioxide to sulfur trioxide is an exothermic reaction. To prevent the loss of this heat, steam has been generated in boilers, and low level process heat has been recovered by heating boiler feed water in economizers.

After oxidation the gas stream containing the sulfur trioxide passes through absorption towers in which the gaseous sulfur trioxide is absorbed into concentrated sulfuric acid, having a typical concentration of 98%. In a modern sulfuric acid plant there are typically two absorption towers, designated as the interpass absorption tower and the final absorption tower, which are respectively located in the process upstream from and downstream from the final catalyst stage in the converter. In the sulfuric acid plants of today, the gas stream is cooled prior to entry into the absorption towers to maximize the recovery of energy from the gas stream. The absorption tower is operated at a temperature which is selected to facilitate the absorption of sulfur trioxide into the sulfuric acid, to minimize the corrosion of piping and heat exchangers that occur at higher temperatures, and to minimize the formation of acid mist. The absorption of sulfur trioxide into sulfuric acid is a highly exothermic reaction, and large amounts of heat are lost to cooling water while maintaining the low temperatures in the typical absorption towers.

The absorption tower is typically constructed such that the sulfuric acid flows downward through the tower and the enclosed packing material while the gas stream which contains the sulfur trioxide passes upward through the tower. The packing promotes contact between the sulfuric acid and the gas stream such that the sulfur trioxide is absorbed in the sulfuric acid. The acid drains into a pump tank, where water is added to dilute the acid to the desired strength. Both absorption and dilution are exothermic reactions, and the generated heat is removed in a heat exchanger which is typically located between the pump tank and the absorption tower inlet. The operation of the absorption tower is characterized by the concentration of the recirculated sulfuric acid, typically 98%, and the low maximum acid exit temperature of approximately 120° C. which limits the acid inlet temperature to approximately 80° C. A lower acid inlet temperature would thermally shock the hot gas stream and often create an undesirable acid mist. A higher acid inlet temperature would increase the acid exit temperature and the corrosion of related piping and heat exchangers. It is thus known that the operating temperature of the absorption tower is set by and limited by considerations of the rate of corrosion of the equipment, and the undesirable formation of acid mist.

The absorption tower has typically been constructed as a brick lined carbon steel tower to limit corrosion. Typically, cast iron or ductile iron pipe has been used around the absorption tower. Historically, a number of materials have been used for acid coolers. These include cast iron pipe or radiator sections, alloy C276 plate type heat exchangers, polytetrafluoroethylene (PTFE) tank coils and stainless steel shell and tube heat exchangers.

The cast iron coolers are limited in operating temperature to approximately 110° C. by corrosion. They have poor heat transfer and occupy a large amount of space within the sulfuric acid plant. In addition, they have many mechanical joints which tend to leak and result in high maintenance requirements.

Alloy C276 plate type heat exchangers can be cost effective relative to the cast iron coolers. However, this expensive alloy is limited in use to a maximum acid temperature of approximately 90° C.; thus, the liquid exiting from the absorption tower at approximately 120° C. is mixed with cold recycle acid before entering the heat exchanger. This reduces the thermal driving force and shows that the use of expensive alloys will not provide an easy solution to the problem of heat recovery from sulfuric acid.

PTFE tank coils have been used to minimize corrosion. Small thin wall tubes, which are easily plugged, are required to obtain adequate heat transfer. The PTFE can withstand temperatures up to 200° C.; however, in heat recovery applications its low mechanical strength limits the pressure of steam that can be generated. Thus, an intermediate heat transfer fluid is required for heat exchange with the hot sulfuric acid. A second heat exchanger is then required for heat exchange between the heat transfer fluid and steam; thus, this design is too expensive for use in this heat recovery application.

Stainless steel heat exchangers, typically type 316 stainless steel, have been used as acid coolers. These require careful control of the acid temperature and the acid velocity in order to minimize corrosion. The more recent anodically protected stainless steel acid coolers have proven to be a reliable means of minimizing corrosion; however, practice has been to limit acid operating temperatures to less than 115° C. The equipment to provide the anodic passivation is expensive.

Past practice with the aforementioned types of heat exchangers has been limited to rejecting the heat into cooling water or recovering heat in a low level form such as hot water for boiler feed or district heating.

Efforts have been made in the past to recover the heat generated when the sulfur trioxide is absorbed into sulfuric acid. U.S. Pat. No. 2,017,676 describes an apparatus for condensing sulfuric acid. Sulfur trioxide and sulfuric acid fumes are passed through a heat exchanger which has ceramic tubes to slowly and uniformly cool the gases from a temperature of about 350° C. to about 140° C. The ceramic tube material is used in contact with the sulfuric acid to prevent corrosion; however, a metallic tube is used concentrically about each ceramic tube to prevent mechanical stress and breakage of the ceramic tubes. The cooling medium, a high boiling point oil or boiling hot water, is allowed to become heated to high temperatures such as would be present in a steam boiler. When operated in this manner, the patent states that approximately 1.5 tons of steam may be generated per ton of sulfuric acid and the sulfuric acid manufacturing costs may be reduced.

British Pat. No. 1,175,055 describes a method for the manufacture of sulfuric acid in which the gases are alternately passed through a catalyst bed to convert sulfur dioxide to sulfur trioxide and a heat exchanger/condenser in which the gases are cooled in the presence of water vapor to condense a part of the sulfur trioxide as sulfuric acid. The heat exchangers are lined with, or constructed of, materials which are resistant to corrosion by the hot, concentrated sulfuric acid such as ceramic materials and porcelain, metals such as steel coated with polytetrafluoroethylene or other corrosion-resistant materials, or metals such as silicon iron and nickel alloys. The heat created by formation of sulfuric acid and the heat released by condensation is utilized to create high pressure steam which may be utilized as a source of power. The British Patent also discusses recovery of the sulfuric acid in a more concentrated form. By employing a stoichiometric deficiency of steam during the intermediate condensations, it is possible to obtain sulfuric acid having a concentration of greater than 100%. Only in the final condensation after completion of the conversion of sulfur dioxide to sulfur trioxide is the remaining sulfur trioxide condensed in the presence of a sufficient excess of steam to insure that substantially all of the sulfuric trioxide is removed from the gas stream.

Both U.S. Pat. No. 2,017,676 and British Pat. No. 1,175,055 teach methods of recovering energy from the sulfuric acid process. However, both patents require the use of exotic materials of construction and emphasize the use of ceramics, porcelain materials, coated metals, brittle metals such as silicon iron, and expensive nickel alloys for construction to prevent rapid corrosion and failure of the equipment.

SUMMARY OF THE INVENTION

It is an object of this invention to provide a method for the recovery of heat which is now lost to cooling water in the sulfuric acid process.

It is a further object of this invention to provide a method for recovery of the heat created in the sulfuric acid process when sulfur trioxide is absorbed into sulfuric acid.

It is yet another object of this invention to provide a method for the absorption of sulfur trioxide into hot, concentrated sulfuric acid while greatly reducing the corrosive effect of the sulfuric acid.

It is yet another object of this invention to provide a method for recovering the heat of absorption of sulfur trioxide in sulfuric acid at a higher temperature level than has heretofore been practicable.

An additional object of this invention is to provide a heat recovery system consisting of a heat recovery tower, heat exchanger and associated equipment such as pumps and piping for use in a sulfuric acid plant which may be constructed of cost effective alloy materials rather than the porcelain, ceramic, and coated materials heretofore proposed for high temperature operation, all of which have mechanical, heat transfer and economic limitations.

These and other objects are obtained through a novel process in which the sulfur trioxide passing from the converter in a sulfuric acid plant is absorbed into hot concentrated sulfuric acid in a heat recovery tower and the heat is recovered for useful purposes in a heat exchanger. The heat recovery tower has top and bottom inlets and top and bottom exits. The sulfur trioxide containing gas stream from the converter, after being cooled, enters the heat recovery tower through the bottom inlet and flows upward through the tower and the hot sulfuric acid stream enters the heat recovery tower through the top inlet and flows downward through the tower. At all points in the heat recovery tower and heat exchanger system the sulfuric acid has a concentration greater than 98% and less than 101% and a temperature greater than 120° C. The acid concentration is defined as being the weight percent of sulfuric acid. The counterflow of the gas stream and sulfuric acid maximizes the driving force for efficiently absorbing the sulfur trioxide into the sulfuric acid. Cocurrent flow of gas and acid can be utilized, but is less efficient. The absorption of sulfur trioxide into sulfuric acid is a process which is known to those having experience in the manufacture of sulfuric acid and will thus not be further described. This process will be referred to herein as the absorption of sulfur trioxide into sulfuric acid and the heat generated by the process will be referred to as the heat of absorption. The heat of absorption includes the heat liberated when water is added to dilute the recycled sulfuric acid, a process step which may occur within or external to the heat recovery tower. After the absorption of sulfur trioxide, the sulfuric acid stream passes through a heat exchanger wherein the heat of absorption is recovered through heat exchange with other fluids. It is desirable that the heat exchanger be fabricated from a metal to facilitate the transfer of heat from the sulfuric acid stream to other fluids. It has been discovered that by operating the heat recovery tower in a very narrow acid concentration range between 98% and 101%, and preferably between 99% and 100%, it is possible to absorb sulfur trioxide efficiently and to dramatically reduce the corrosion rate of certain alloys while operating at temperatures heretofore considered impossible. It has been discovered that certain alloys exhibit excellent corrosion resistance in the concentration range previously defined. Stainless steel alloys are generally superior to high nickel alloys. Excellent corrosion resistance has been found for selected stainless steel alloys with austenitic, ferritic or duplex structures. Thirty alloys were tested at service conditions typical of the heat recovery system. It has been determined that the corrosion resistance of these alloys can be characterized in terms of the percentages of major alloying constituents. The alloys best suited for service in this heat recovery system had compositions which gave a corrosion index (CI) greater than 39

$$CI > 39$$

as defined by the following equation:

$$CI = 0.35(Fe + Mn) + 0.70(Cr) + 0.30(Ni) - 0.12(Mo)$$

where:
Fe = the weight percent of iron in the alloy,
Mn = the weight percent of manganese in the alloy,
Cr = the weight percent of chromium in the alloy,
Ni = the weight percent of nickel in the alloy, and
Mo = the weight percent of molybdenum in the alloy.

The invention also encompasses a method for recovery of heat from a sulfuric acid process which comprises absorbing sulfur trioxide into liquid sulfuric acid, the sulfuric acid having a concentration greater than 98% and less than 101% and a temperature greater than 120° C., generating the heat of absorption, and removing the heat of absorption from the sulfuric acid through heat exchange with another fluid.

In a conventional sulfuric acid plant the heat of absorption of sulfur trioxide into sulfuric acid, is lost to cooling towers. By use of the process and apparatus of this invention, a high percentage of this previously lost energy may be recovered and profitably used. The heat may be used, for example, to produce low pressure steam for process heating or to power a turbogenerator for the generation of electricity. In a 2700 tonne per day sulfur burning sulfuric acid plant approximately 6 megawatts of additional electrical power can be produced from the heat recovered in the heat recovery tower.

DESCRIPTION OF THE PREFERRED EMBODIMENT

Figure 1:
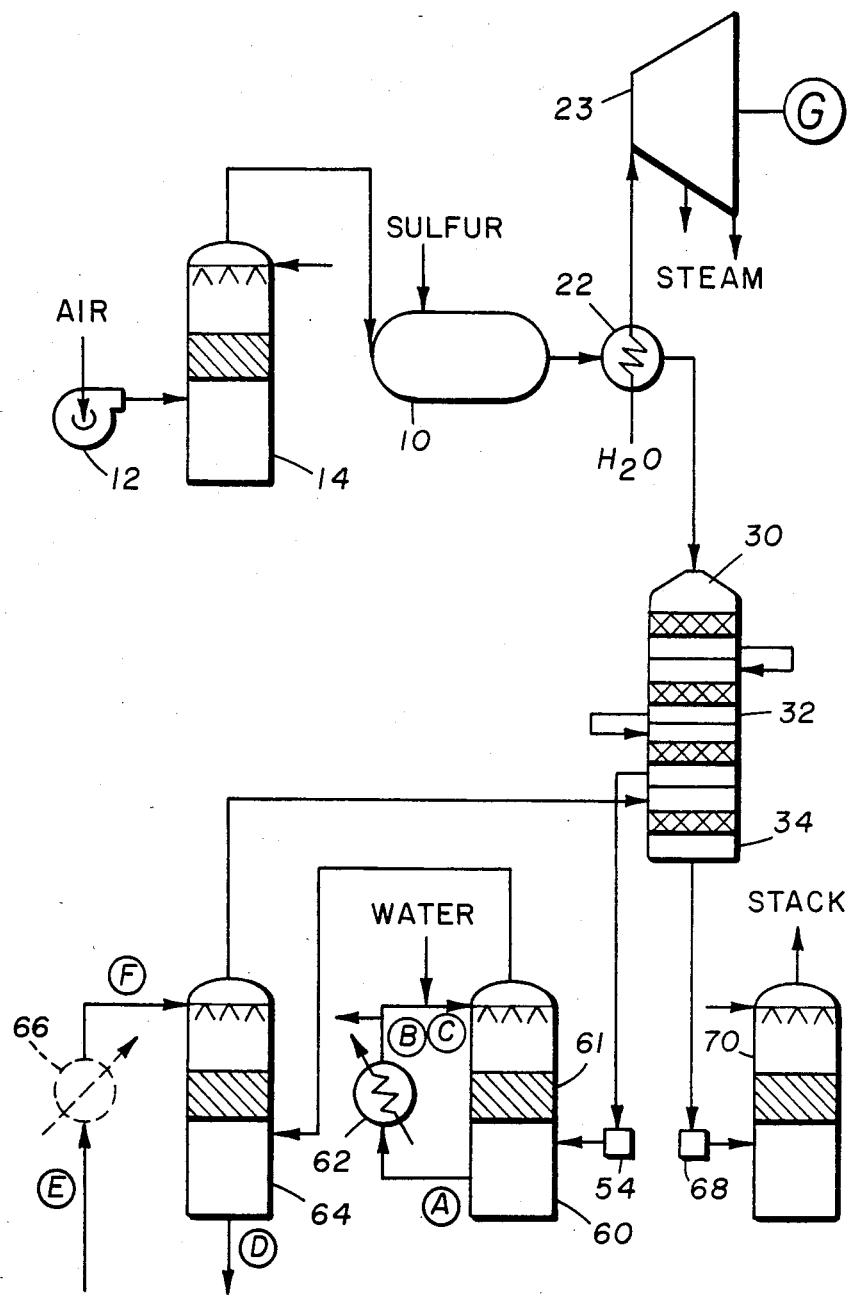
FIG. 1 is a process flow diagram of a sulfuric acid plant which includes the apparatus of this invention.

FIG. 1 illustrates a process flow diagram for a sulfuric acid plant which includes the apparatus of this invention. The sulfuric acid process is well known; thus, portions of the sulfuric acid plant will not be described in detail herein. The drawing shows a sulfuric acid plant which burns sulfur to supply the gas stream containing sulfur dioxide to the sulfuric acid plant.

Looking now at FIG. 1, blower 12 supplies air through drying tower 14 to the sulfur burner 10 in which the sulfur is burned, to provide a gas stream containing sulfur dioxide. The sulfur dioxide laden feed gas stream exits from the sulfur burner 10 and passes through a first heat exchanger 22, before entering the converter 30. The feed gas is cooled in first heat exchanger 22 to a temperature near the desired inlet temperature to the converter. First heat exchanger 22 is used to generate steam for driving a turbogenerator 23 for the generation of electrical power, but other uses are also practical.

Converter 30, a vessel for the catalytic conversion of sulfur dioxide into sulfur trioxide, typically has a plurality of catalyst beds which are divided into a first oxidation stage 32 and a second oxidation stage 34. Between any two catalyst beds there is heat exchange to remove the heat generated during the oxidation of the sulfur dioxide. These heat exchangers are not shown in FIG. 1. In a typical sulfuric acid plant, between the first oxidation stage 32 and the second oxidation stage 34 the gas stream passes through an interpass absorption tower to remove the sulfur trioxide from the gas stream to provide a gas stream to the second oxidation stage 34 that is lean in sulfur trioxide. As the sulfur dioxide laden feed gas stream passes through the first oxidation stage 32, greater than 90% of the sulfur dioxide will be converted to sulfur trioxide. The oxidation reaction is a reversible reaction which approaches an equilibrium; thus, some of the sulfur trioxide must be removed from the gas stream to enable the remaining sulfur dioxide to be oxidized easily. Economizer 54 is used to cool the gas stream exiting from the first oxidation stage 32 to a temperature which is above the dew point of the gas stream.

The sulfur trioxide in the gas stream is then absorbed into a sulfuric acid stream and heat is generated by the process. The absorption typically takes place in an absorption tower in which the acid temperature is maintained at a low level, to minimize corrosion of related piping and heat exchangers. However, the maintenance of the low temperature in the absorption tower makes it difficult to recover energy in an economically viable manner, that is in a useful form.

In accordance with this invention, a heat recovery tower 60 is provided downstream of the economizer 54. The cooled sulfur trioxide laden gas stream enters the the lower portion of heat recovery tower 60 and flows upward through a bed of packing 61. While this description is of a packed tower, it is contemplated that other gas-liquid contacting devices such as tray towers can be used. Hot, liquid sulfuric acid is sprayed from the top of the heat recovery tower 60 onto the bed of packing 61 and, as the sulfuric acid and sulfur trioxide contact one another, the sulfur trioxide is absorbed into the sulfuric acid. The sulfuric acid in the heat recovery tower 60 has a concentration greater than 98% and less than 101% and a temperature greater than 120° C. As discussed above, the heat of absorption of the sulfur trioxide into the sulfuric acid is released in this process. The hot sulfuric acid enters the heat recovery tower 60 at a temperature greater than 120° C. and, after absorbing the sulfur trioxide and being heated by the exothermic reaction, the sulfuric acid exits from the heat recovery tower. The hot concentrated sulfuric acid stream passes through heat exchanger 62 to remove the heat of absorption of the sulfur trioxide, prior to again being circulated through the heat recovery tower. The absorption of the sulfur trioxide increases the concentration of the sulfuric acid; therefore, the sulfuric acid must be diluted at some point. The required water may be added within the heat recovery tower 60 or into the piping between the heat recovery tower 60 and the heat exchanger 62; however, it is preferred that the dilution water be added following cooling of the sulfuric acid in heat exchanger 62 at a point in which sufficient mixing may occur before the sulfuric acid enters the heat recovery tower 60. The dilution water can also be added as a vapor. This increases the amount of heat recovered and provides a means of upgrading atmospheric pressure steam to a useable higher pressure. Alternately, the dilution water can be added as dilute sulfuric acid.

In FIG. 1 the heat exchanger 62 is shown external from the heat recovery tower 60. While this is the preferred arrangement, it is recognized that the heat exchanger 62 may be located within the heat recovery tower 60. In heat exchanger 62 the heat of absorption released in the process is removed by the generation of low pressure steam, for example, steam having an absolute pressure between approximately 150 and 1500 kPa and normally between approximately 300 and 500 kPa. The steam produced by the heat recovery system is approximately 0.5 tonnes per tonne of acid produced when liquid water is used for acid dilution. This low pressure steam may be used within the manufacturing complex surrounding the sulfuric acid plant or to generate electricity. It is a common practice to remove low pressure steam from a turbogenerator for process use. The removal of this low pressure steam reduces the electrical output of the turbogenerator. The low pressure steam generated in the heat exchanger 62 may be used to reduce the amount of low pressure steam normally removed from the turbogenerator or to eliminate this removal of steam altogether. If additional steam is available, low pressure steam may be injected into the turbogenerator 23. The cessation of removal of low pressure steam from the turbogenerator increases its electrical output and the injection of additional low pressure steam will also increase the turbogenerator's electrical output. In a 2700 tonne per day sulfur burning sulfuric acid plant, approximately 6 megawatts of additional electrical power can be produced as a result of the use of the low pressure steam generated in the heat exchanger 62. Alternately, electrical power can be generated by using heat exchanger 62 as the boiler in an organic Rankine cycle. The higher temperatures available through the use of the heat recovery tower have now made such usage economically feasible.

In this way the heat of absorption of sulfur trioxide into sulfuric acid may be removed from the sulfuric acid process in a useful form; that is, in a form which may be utilized to produce a benefit either through use in a process or through the generation of electricity. This is in contrast to the current typical loss of this heat through removal by cooling water and release of the heat to the atmosphere in cooling towers Following passage of the gas stream through the heat recovery tower, the gas stream exits from the top of the heat recovery tower 60 and passes to an interpass absorption tower 64 where absorption of any sulfur trioxide remaining in the gas stream takes place. In a typical sulfuric acid plant in which all of the sulfur trioxide is absorbed into a sulfuric acid stream in the interpass absorption tower 64, it is necessary to remove the heat of absorption. Thus, an acid cooler 66 is provided for the sulfuric acid recirculating through the interpass absorption tower 64. However, in a sulfuric acid plant utilizing the current invention, most of the sulfur trioxide is absorbed into sulfuric acid in the heat recovery tower 60; thus, only a small portion of the sulfur trioxide remains to be absorbed in the interpass absorption tower 64. Only a small temperature rise occurs within the interpass absorption tower 64. In the circumstances this small heat load may be removed elsewhere in the system; thus, the acid cooler 66 is usually unnecessary and may be eliminated. The dotted lines used to show the acid cooler 66 in FIG. 1 indicate that the acid cooler 66 has been removed from the process.

The remainder of the sulfuric acid process shown in FIG. 1 is well known. The sulfur trioxide depleted gas stream is returned to the second oxidation stage 34 of the converter 30 to complete oxidation of the remaining sulfur dioxide. This final passage through an oxidation stage will complete the conversion of sulfur dioxide to sulfur trioxide. The gas stream exits from the converter 30, passes through an economizer 68 for cooling, and passes through the final absorption tower 70 in which the sulfur trioxide in the gas stream is absorbed into sulfuric acid. The amount of sulfur trioxide present to be absorbed is much smaller than that which is absorbed in the heat recovery tower and interpass absorption tower; thus, only a small amount of heat is created by the absorption of the sulfur trioxide into sulfuric acid in the final absorption tower 70. Following absorption of the sulfur trioxide, the gas stream is released to the atmosphere.

While the above description is for an interpass plant, it is contemplated that the heat recovery tower can be installed upstream of the absorbing tower in a non-interpass plant. For some operating conditions, it is also contemplated that the heat recovery tower can replace the interpass absorption tower in an interpass plant, or the absorbing tower in a non-interpass plant. This is not the preferred method of practice, since upsets in operation of the heat recovery tower could reduce absorption efficiency causing increased plant emissions, corrosion of downstream equipment, or both.

Figure 2:
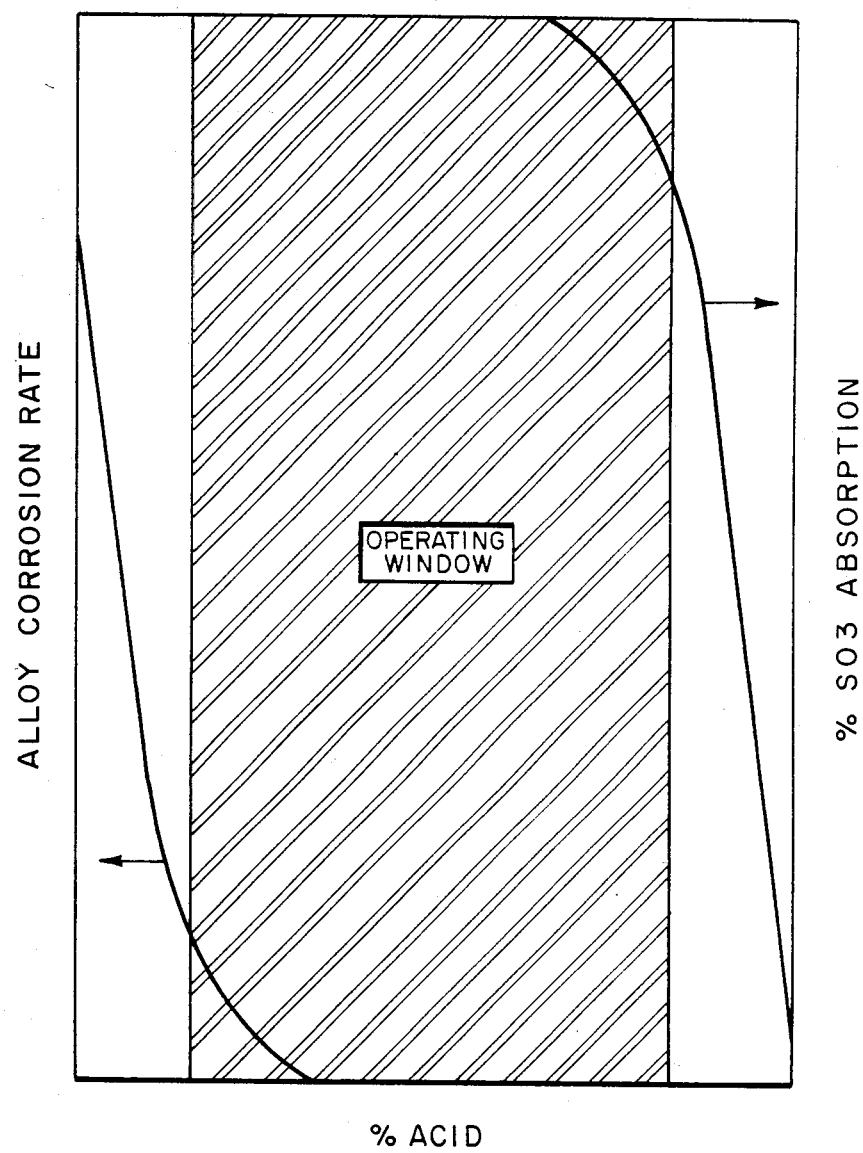
FIG. 2 is a schematic which illustrates the corrosion rate of alloys and the degree of absorption of sulfur trioxide into sulfuric acid at a given temperature as the concentration of the sulfuric acid varies.

Referring to FIG. 2, it can be seen that at constant temperature, both the corrosion rate of certain alloys and the degree of $SO_3$ absorption decrease rapidly as the sulfuric acid concentration increases. It has been determined for this invention that there is a narrow window of operation in which the corrosiveness of the sulfuric acid to certain alloys at high temperature is greatly reduced while the absorption of sulfur trioxide into sulfuric acid is maintained at a sufficient level to remove the sulfur trioxide from the gas stream passing through the heat recovery tower.

Figure 3:
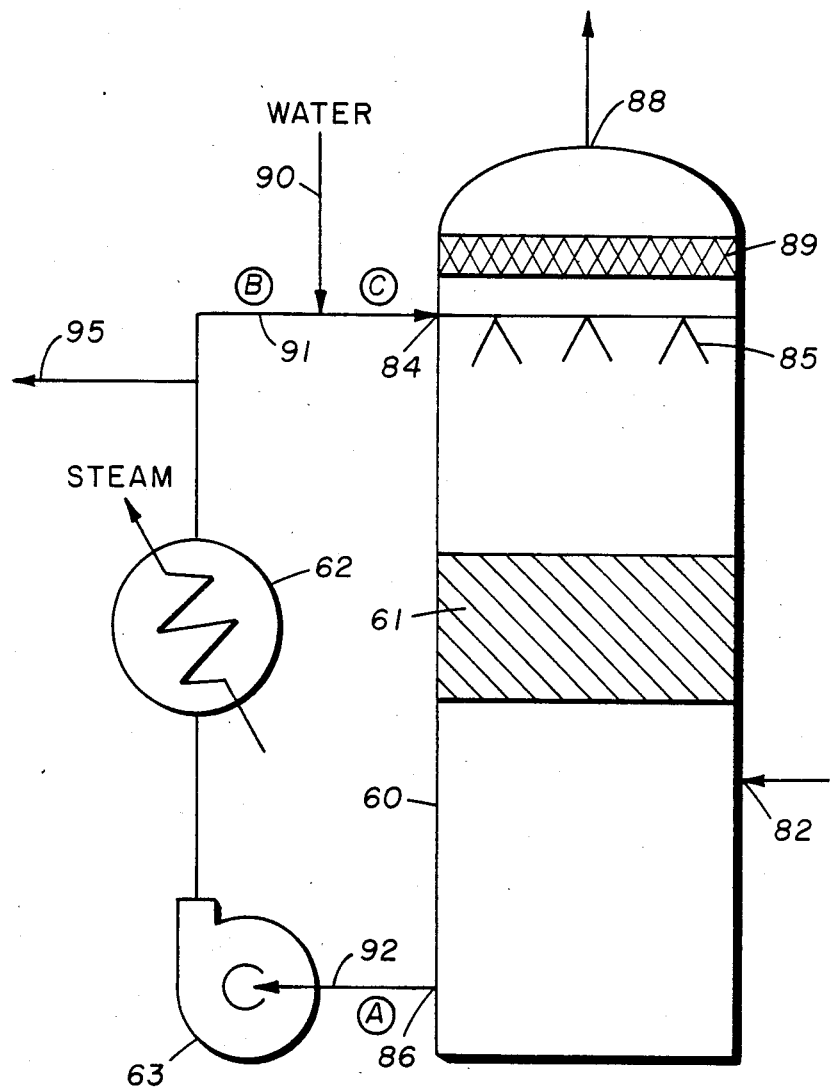
FIG. 3 is a diagram of the process and apparatus of this invention.

Referring now to FIG. 3, the heat recovery tower 60 of this invention and its associated piping, including the heat exchanger 62 and pump 63 are shown. The sulfur trioxide laden gas stream, leaving the first oxidation stage 32 of converter 30, enters the heat recovery tower 60 through bottom inlet 82. The gas stream passes upward through the bed of packing 61 in which it contacts the sulfuric acid stream and the sulfur trioxide is absorbed into the sulfuric acid. The sulfur trioxide depleted gas stream exits from the heat recovery tower 60 through mist eliminator 89 and top outlet 88. The sulfuric acid enters the heat recovery tower 60 through top inlet 84 and is sprayed through a plurality of acid distributors 85 onto the upper surface of the bed of packing 61. The sulfuric acid flows downward through the bed of packing 61 in which it comes in contact with the rising sulfur trioxide laden gas stream and the sulfur trioxide is absorbed into the sulfuric acid. The absorption of the sulfur trioxide into the sulfuric acid is an exothermic process. The hot sulfuric acid enters the heat recovery tower 60 at a temperature greater than 120° C. and, after absorbing the sulfur trioxide and being heated by the exothermic reaction, the sulfuric acid exits from the heat recovery tower 60 at a temperature as high as 240° C. The sulfuric acid exits from the heat recovery tower through bottom outlet 86 and is pumped by pump 63 through heat exchanger 62 to remove the heat generated by the absorption of the sulfur trioxide prior to again being circulated through tower 60. Following passage through heat exchanger 62, a portion of the sulfuric acid is removed through the acid pipe 95. In addition to the rise in the temperature of the sulfuric acid, the absorption of the sulfur trioxide increases the concentration of the sulfuric acid; therefore, the sulfuric acid must be diluted. The sulfuric acid may be diluted by the addition of dilute sulfuric acid or water in the liquid or vapor state; and the terms water or dilution water will be used to refer to the diluent. The required water for dilution of the acid is shown being added through pipe 90. It is preferred that the dilution water be added, as shown, in the piping 91 between the heat exchanger 62 and the entry of the sulfuric acid into the heat recovery tower 60 through top inlet 84. However, the addition of the dilution water at this point is not required for this invention. The dilution water may be added prior to passage of the sulfuric acid through the heat exchanger 62 or may be added to the sulfuric acid within the heat recovery tower 60. The preferred location for the addition of dilution water, represented by pipe 90, allows the alloy pump and heat exchanger to operate at the highest sulfuric acid concentration, which gives the lowest rate of corrosion, at any given temperature within the operating range.

For the purposes of this invention it has been determined that the preferred operating conditions for the heat recovery tower comprise sulfuric acid temperatures greater than 120° C. and concentrations greater than 98% and less than 101%. Operation of the heat recovery tower under these conditions provides the reduced sulfuric acid corrosiveness to certain alloys necessary for operation of the equipment for long periods of time and a high degree of absorption of sulfur trioxide into the sulfuric acid. A reduced level of sulfur trioxide absorption would reduce the amount of energy recovered in useful form. The upper acid concentration limit of 101% is established on the basis of achieving a high degree of absorption while operating the heat recovery tower at near atmospheric pressure. The upper acid concentration limit can be extended to approximately 105% if the heat recovery tower is operated at a pressure up to 1000 kPa.

It has been determined that certain materials are particularly suitable for construction of the heat recovery tower 60, the heat exchanger 62, the pump 63 and the other equipment associated with them. In particular, certain alloys have been found to be preferable for their corrosion resistance at the conditions under which the heat recovery tower, heat exchanger and pump will be operated. It has been determined that the corrosion resistance of these alloys can be characterized in terms of the percentages of the major alloying constituents. The alloys best suited for service in this heat recovery system have compositions which give a corrosion index (CI) greater than 39, $$CI > 39$$

as defined by the following equation:

$$CI = 0.35(Fe + Mn) + 0.70(Cr) + 0.30(Ni) - 0.12(Mo)$$

where:
Fe = the weight percent of iron in the alloy,
Mn = the weight percent of manganese in the alloy,
Cr = the weight percent of chromium in the alloy,
Ni = the weight percent of nickel in the alloy, and
Mo = the weight percent of molybdenum in the alloy.

While these alloys are preferred for construction, sometimes conventional materials of construction for the heat recovery tower will be more cost effective. At these times the heat recovery tower can be constructed of carbon steel and lined with a ceramic material to protect the carbon steel shell from the corrosive attack of the sulfuric acid. Such construction is very similar to that typically utilized for the interpass absorption tower.

The function of the heat recovery tower is to contain the sulfuric acid and the sulfur trioxide laden gas stream and to provide for the contacting of these two streams such that the sulfur trioxide is absorbed into the sulfuric acid. As the absorption of the sulfur trioxide into the sulfuric acid is an exothermic reaction, the acid is heated. It is preferred that the sulfuric acid entering the heat recovery tower have a temperature greater than 120° C. The heat of absorption will raise this temperature to as much as 240° C. While this is the preferred operating range for the acid temperature, it is possible to operate at higher temperatures by increasing the pressure or reducing the degree of sulfur trioxide absorption. In the preferred temperature range low pressure steam, for example, steam having a pressure between approximately 150 and 1500 kPa may be generated. Increasing the steam pressure will require a corresponding increase in the temperature of the sulfuric acid entering the heat recovery tower.

Again, it must be stated that this invention is not limited to the configuration shown in FIG. 3. The heat exchanger 62 is shown located externally of the heat recovery tower 60. This is for numerous reasons the preferred embodiment; however, the heat exchanger may also be located within the heat recovery tower 60. Similarly, the dilution water is shown being added through pipe 90 into pipe 91 between the heat exchanger 62 and the top inlet 84 to the heat recovery tower 60. With this preferred configuration the heat exchanger 62 and pump 63 always contact acid of the highest concentration which provides the lowest corrosion rates and the highest degree of protection to the heat exchanger and pump. It is also contemplated, and is a part of this invention, that the dilution water may be added into pipe 92 which is located between the bottom outlet 86 of heat recovery tower 60 and the heat exchanger 62. It is also contemplated that the dilution water could be added directly to the heat recovery tower 60 or to the gas stream entering the tower. It is noted that the addition of dilution water at these latter points will reduce the sulfuric acid concentration before it passes through the pump 63 and heat exchanger 62 and that this lower sulfuric acid concentration will result in a higher corrosion rate for the heat exchanger 62 and pump 63.

Figure 4:
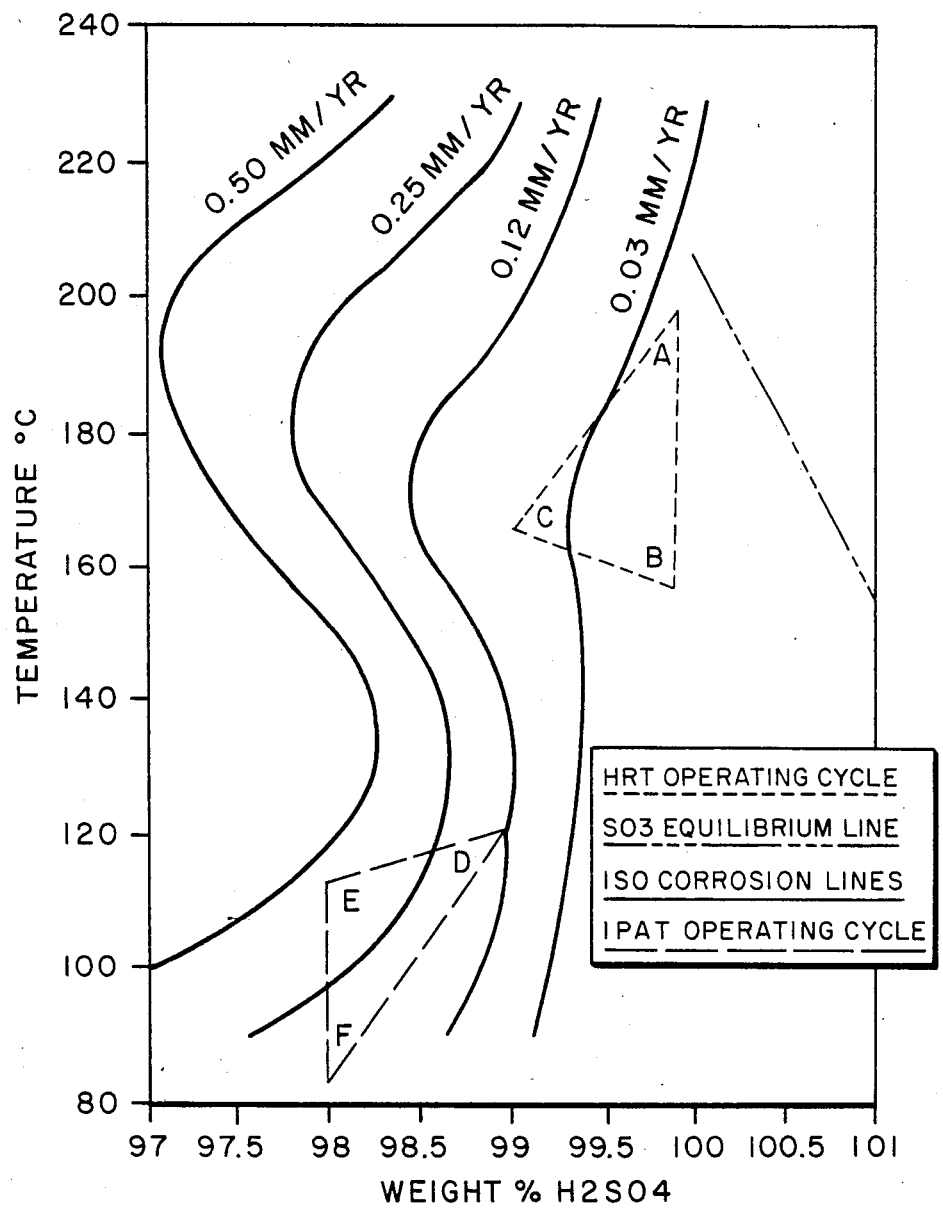
FIG. 4 is a graph showing the operating cycle of the heat recovery tower in relation to the operating cycle of a typical interpass absorption tower.

FIG. 4 is a graph which shows the operating cycle of the heat recovery tower 60 in terms of the temperature and concentration of the sulfuric acid. Shown on the graph are isocorrosion lines for type 304L stainless steel. Also shown is a line representing the sulfur trioxide equilibrium between typical inlet gas and outlet acid. This equilibrium line defines the limiting conditions for the absorption of sulfur trioxide in the acid at atmospheric pressure. The operating cycle of the heat recovery tower is shown as a triangle ABC. The location of points A, B and C in the process may be found on FIG. 3 and FIG. 1. Point A of the operating cycle represents the conditions, the temperature and concentration of the sulfuric acid, at the bottom outlet 86 from the heat recovery tower 60. Point B represents the sulfuric acid conditions after passage through the heat exchanger 62. Point C represents the sulfuric acid conditions as the sulfuric acid is entering the heat recovery tower through top inlet 84, after the addition of the dilution water.

Looking at FIGS. 3 and 4, it is of interest to discuss a complete operating cycle by considering the flow of the sulfuric acid starting at point C. The sulfuric acid enters the heat recovery tower 60 at a temperature of approximately 165° C. and a concentration of approximately 99%. As the sulfuric acid passes downward through the heat recovery tower and absorbs the sulfur trioxide from the gas stream passing upward through the heat recovery tower an exothermic reaction takes place. The temperature of the sulfuric acid rises and the concentration increases. At the outlet of the heat recovery tower, represented by point A, the sulfuric acid has a temperature of approximately 200° C. and a concentration of approximately 100%. Following the heat recovery tower, the sulfuric acid flows through heat exchanger 62 and is cooled. Reference point B is at the exit of the heat exchanger 62. At this point the acid has been cooled from approximately 200° C. to approximately 157° C. and the acid concentration has remained constant. Before the sulfuric acid enters the heat recovery tower again, dilution water is added. The addition of water to the concentrated sulfuric acid reduces the concentration and causes a rise in temperature. Therefore, the triangle of the operating cycle shows that the concentration of the sulfuric acid is reduced from approximately 100% to approximately 99% and that, during this reduction, the temperature of the sulfuric acid rises from approximately 157° C. to 165° C. At this point the sulfuric acid again enters the heat recovery tower and the operating cycle is repeated.

It is easy to see in FIG. 4 the relationship between the operating cycle of the heat recovery tower 60, which includes the heat exchanger 62, the corrosion rates for type 304L stainless steel at different temperatures and sulfuric acid strengths, and the equilibrium line for the absorption of sulfur trioxide into the sulfuric acid. This operating cycle is compared to the operating cycle of a typical interpass absorption tower represented by the triangle DEF. The location of points D, E, and F in the process may be found on FIG. 1. Point D represents the conditions of temperature and acid concentration leaving the interpass tower. Point E represents a typical condition where the acid in the pump tank has been diluted with water and cooled by mixing with colder acid draining from the drying tower circuit. Point F represents the temperature and acid concentration leaving the acid cooler and recirculating to the interpass absorbing tower. It can be seen in FIG. 4 that the heat recovery tower of this invention permits absorbing sulfur trioxide at significantly higher temperature than previously practiced, while reducing corrosion rates for type 304L stainless steel by a factor of ten or more, compared to that obtained at acid temperatures and concentrations characteristic of past practices. Significant reductions in corrosion rates were found for the other alloys which have a corrosion index (CI) greater than 39, with the extent of the reduction dependent upon the specific alloy.

EXAMPLE 1

Table 1 shows corrosion test data for four alloys. Alloy 26-1 is a ferritic stainless steel, Alloy 255 is a duplex stainless steel, Alloy 304L is an austenetic stainless steel, and Alloy C276 is a high nickel alloy. Alloy 255 comprises between about 24.0% and about 27.0% by weight chromium, between about 2.0% and about 4.0% molybdenum, between about 4.5% and about 6.5% nickel, between about 1.5% and about 2.5% by weight copper, between about 0.10% and about 0.25% by weight nitrogen, up to about 1.0% by weight silicon, up to about 1.5% by weight manganese, up to about 0.04% by weight carbon, up to about 0.04% by weight phosphorus, up to about 0.03% by weight sulfur, and the balance essentially iron. E-Brite Alloy 26-1 comprises between about 25.0% and about 27.5% by weight chromium, between about 0.75% and about 1.50% by weight molybdenum, between about 0.05% and about 0.20% by weight niobium, up to about 0.50% by weight nickel, up to about 0.20% by weight copper, up to about 0.40% by weight manganese, up to about 0.02% by weight phosphorus, up to about 0.02% by weight sulfur, up to about 0.40% by weight silicon, up to about 0.010% by weight carbon, up to about 0.015% by weight nitrogen, and the balance essentially iron. Alloy C276 comprises between about 14.50% and about 16.50% by weight chromium, between about 15.00% and about 17.00% by weight molybdenum, between about 3.00% and about 4.50% by weight tungsten, between about 4.00% and about 7.00% by weight iron, up to about 2.50% by weight cobalt, up to about 0.08% by weight silicon, up to about 1.00% by weight manganese, up to about 0.02% by weight carbon, up to about 0.35% by weight vanadium, up to about 0.04% by weight phosphorus, up to about 0.03% by weight sulfur, and the balance essentially nickel. Type 304L stainless steel comprises approximately 19.00% by weight chromium, approximately 10.00% by weight nickel, approximately 1.00% by weight manganese, approximately 0.50% by weight silicon, approximately 0.025% by weight carbon, and the balance essentially iron. Alloys 255, 26-1, and 304L stainless steel exemplify a subclass of preferred alloys which generally contain between about 19% and about 28% by weight chromium, up to about 10% by weight nickel, up to about 4% by weight molybdenum, up to about 1.5% by weight manganese, up to about 1% by weight silicon, up to about 0.04% by weight carbon, and the balance essentially iron.

The stainless steel alloys experience as much as a 35-fold increase in the corrosion rate when the sulfuric acid concentration is decreased from 100 weight percent acid to approximately 98%. The Alloy C276 shows a similar trend; however, the change in corrosion rate is much less dramatic. If the Alloy C276 data is compared with any of the stainless steel data, it can easily be seen that there is a considerable advantage for stainless steel alloys when used in accordance with the teachings of this invention.

At the elevated temperatures normally encountered in the heat recovery tower and heat exchanger many alloys become more passive, or resistant to corrosion. This effect can be seen for the Alloy C276 data given in Table 1 and for the 304L stainless steel isocorrosion lines in FIG. 4.

TABLE 1

| | CORROSION EXPERIMENTS | | | |
|---|---|---|---|---|
| ALLOY NAME | UNS DESIG- NATION | COR- ROSION INDEX (CI) | WT % H$_2$SO$_4$ | CORROSION RATE (mm/yr) |
| | | | | 143° C.    227° C. |
| Alloy 26-1 | S44625 | 44 | 98.0 | 0.04    0.37 |
| | | | 98.5 | 0.03    0.20 |
| | | | 99.0 | 0.00    0.03 |
| | | | 100.0 | 0.00    0.01 |
| Alloy 255 | S32550 | 42 | 98.0 | 0.22    0.70 |
| | | | 98.5 | 0.02    0.18 |
| | | | 99.0 | 0.01    0.05 |
| | | | 100.0 | 0.00    0.02 |
| Alloy 304L | S30403 | 40 | 98.0 | 0.57    0.89 |
| | | | 98.5 | 0.33    0.43 |
| | | | 99.0 | 0.16    0.21 |
| | | | 100.0 | 0.04    0.03 |
| Alloy C276 | N10276 | 32 | 98.0 | 1.56    0.47 |
| | | | 98.5 | 0.83    0.24 |
| | | | 99.0 | 0.52    0.13 |
| | | | 100.0 | 0.33    0.20 |

EXAMPLE 2

A pilot heat recovery tower is installed ahead of the final absorption tower in a non-interpass sulfur burning sulfuric acid plant. A process gas slipstream of 5.0 Nm$^3$/min at a temperature of 260° C. and containing 7.5 volume percent sulfur trioxide is fed to the heat recovery tower. Sulfuric acid with a concentration of 99.0 weight percent and a temperature of 162° C. is fed to the top of the heat recovery tower at a rate of 35 kg/min. The acid leaves the tower at a concentration of 99.9 weight percent and a temperature of 201° C. Overall absorption of sulfur trioxide from the feed gas stream is approximately 96%. Acid flows by gravity from the tower to a pump tank, from whence it is pumped to a boiler where 0.8 kg/min of steam is generated at a pressure of 450 kPa. Acid leaves the boiler at a temperature of 155° C. and is diluted to 99.0 weight percent by in-line addition of liquid water. The heat of dilution increases the acid temperature to 162° C. This stream is then circulated to the top of the tower, completing the cycle. Continuous corrosion monitors mounted before and after the boiler show that type 304L stainless steel probes corrode at less than 0.05 mm/year.

We claim:

1. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery tower to which said sulfuric acid is delivered at a concentration of at least 98% and a temperature of at least 120° C., and from which said sulfuric acid is discharged at a concentration of at least 99% and a temperature greater than 120° C.; and removing the heat of absorption from said sulfuric acid in useful form through transfer of heat to another fluid in said heat exchanger and thereby heating said another fluid to a temperature greater than 120° C., said heat exchanger comprising means for transfer of heat from said sulfuric acid to another fluid, said means comprising an alloy selected from the group consisting of ferrous alloys containing chromium, iron-nickel alloys containing chromium and nickel base alloys containing chromium, said alloy having a ferritic, austenitic or austenitic-ferritic duplex structure, the composition of the said alloy further satisfying the following relationship:

$$0.35(Fe+Mn)+0.70(Cr)+0.30(Ni)-0.12(Mo) > 39$$

where:
Fe = the weight percent of iron in the alloy,
Mn = the weight percent of manganese in the alloy,
Cr = the weight percent of chromium in the alloy,
Ni = the weight percent of nickel in the alloy, and
Mo = the weight percent of molybdenum in the alloy.

2. An improved process as set forth in claim 1 wherein said sulfuric acid leaves said tower in a stream having a temperature greater than 120° C., said sulfuric acid stream is passed through said heat exchanger, and at least a portion of the cooled acid stream is recycled to said tower.

3. An improved as set forth in claim 2 wherein said sulfuric acid is diluted during recirculation to a strength greater than 98% and less than about 99%, 4. An improved process as set forth in claim 3 wherein dilution is effected by adding a diluent selected from the group consisting of liquid water, steam, and relatively dilute sulfuric acid to said circulating stream after heat transfer to said another fluid and before entry of said acid into said tower.

5. An improved process as set forth in claim 1 wherein said sulfuric acid has a temperature of greater than 120° C. and less than about 240° C. as it exits said tower.

6. An improved process as set forth in claim 1 wherein said another fluid comprising a liquid as it enters said heat exchanger and consists essentially of a vapor as it exits said heat exchanger.

7. An improved process as set forth in claim 6 wherein said another fluid comprises water, and steam is generated in said heat exchanger.

8. An improved process as set forth in claim 6 wherein said another fluid as introduced into said heat exchanger comprises an organic liquid, and the organic vapor generated in said heat exchanger is used in an organic Rankine cycle to produce work.

9. An improved process as set forth in claim 1 wherein said heat transfer means comprises means for indirect transfer of heat from said sulfuric acid to said another fluid.

10. An improved process as set forth in claim 1 wherein the gas leaving said heat recovery tower is contacted with sulfuric acid in another absorption tower, thereby effecting further absorption of SO$_3$ contained in said gas.

11. An improved process as set forth in claim 1 wherein said sulfuric acid and said gas are passed countercurrently through said tower.

12. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery tower to which sulfuric acid is delivered at a concentration of at least 98% and a temperature of at least 120° C., and from which sulfuric acid is discharged at a concentration of at least 99% and a temperature greater than 120° C.;

removing the heat of absorption from said sulfuric acid in useful form through transfer of heat to another fluid in said heat exchanger and thereby heating said another fluid to a temperature greater than 120° C., said sulfuric acid having a temperature greater than 120° C. and a concentration of at least 99% throughout the course of heat transfer to said another fluid; and contacting the exit gas from said heat recovery tower with sulfuric acid in another absorption tower for removal of residual sulfur trioxide from said exit gas before either exhausting said exit gas from the process or catalytically oxidizing sulfur dioxide contained therein to produce additional sulfur trioxide, the temperature of the sulfuric acid throughout said another absorption tower being lower than the temperature of the sulfuric acid at the inlet of said heat recovery tower.

13. An improved process as set forth in claim 12 wherein said sulfuric acid leaves said heat recovery tower in a stream having a temperature greater than 120° C., said sulfuric acid stream is passed through said heat exchanger, and at least a portion of the cooled sulfuric acid stream is recycled to said heat recovery tower.

14. An improved process as set forth in claim 13 wherein said sulfuric acid is diluted during recirculation to a strength greater than 98% and less than about 99%.

15. An improved process as set forth in claim 14 wherein dilution is effected by adding a diluent selected from the group consisting of liquid water, steam, and relatively dilute sulfuric acid to said circulating stream after heat transfer to said another fluid and before entry of said sulfuric acid into said heat recovery tower.

16. An improved process as set forth in claim 12 wherein said heat exchanger comprises means for indirect transfer of heat from said sulfuric acid to said another fluid.

17. An improved process as set forth in claim 12 wherein said another fluid as introduced into said heat exchanger comprises a liquid, and transfer of heat to said another fluid results in vaporization of said another fluid so that said another fluid comprises a vapor as it exits said heat exchanger.

18. An improved process as set forth in claim 17 wherein said another fluid consists essentially of a vapor as it exits said heat exchanger.

19. An improved process as set forth in claim 18 wherein said another fluid comprises water, and steam is generated in said heat exchanger.

20. An improved process as set forth in claim 18 said another fluid as introduced into said heat exchanger comprises an organic liquid, and the organic vapor generated in said heat exchanger is used in an organic Rankine cycle to produce work.

21. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, said heat exchanger comprising means for transfer of heat from said sulfuric acid to said another fluid, said means being constituted of an alloy which comprises between about 24.0% and about 27.0% by weight chromium, between about 2.0% and about 4.0% by weight molybdenum, between about 4.5% and about 6.5% by weight nickel, between about 1.5% and about 2.5% by weight copper, between about 0.10% and about 0.25% by weight nitrogen, up to about 1.0% by weight silicon, up to about 1.5% by weight manganese, up to about 0.04% by weight carbon, up to about 0.04% by weight phosphorus, up to about 0.03% by weight sulfur, and the balance essentially iron, the improvement which comprises:
absorbing said sulfur trioxide in sulfuric acid having a concentration of greater than 98% and less than 101% and a temperature greater than 120° C., thereby generating the heat of absorption; and
removing said heat of absorption from said sulfuric acid in useful form through heat exchange with another fluid in said heat exchanger comprising said heat transfer means, and thereby heating said another fluid to a temperature of greater than 120° C.

22. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, said heat exchanger comprising means for transfer of heat from said sulfuric acid to said another fluid, said means being constituted of an alloy which comprises between about 25.0% and about 27.5% by weight chromium, between about 0.75% and about 1.50% by weight molybdenum, between about 0.05% and about 0.20% by weight niobium, up to about 0.50% by weight nickel, up to about 0.20% by weight copper, up to about 0.40% by weight manganese, up to about 0.02% by weight phosphorus, up to about 0.02% by weight sulfur, up to about 0.40% by weight silicon, up to about 0.010% by weight carbon, up to about 0.015% by weight nitrogen, and the balance essentially iron, the improvement which comprises:
absorbing said sulfur trioxide in sulfuric acid having a concentration of greater than 98% and less than 101% and a temperature greater than 120° C., thereby generating the heat of absorption; and
removing said heat of absorption from said sulfuric acid in useful form through heat exchange with another fluid in said heat exchanger comprising said heat transfer means, and thereby heating said another fluid to a temperature of greater than 120° C.

23. In a process for the manufacture of sulfuric acid comprising the catalytic oxidation of sulfur dioxide to sulfur trioxide, absorption of the sulfur trioxode in sulfuric acid, and cooling the sulfuric acid in a heat exchanger by transfer of heat to another fluid, said heat exchanger comprising means for transfer of heat from said sulfuric acid to said another fluid, said means being constituted of an alloy which comprises approximately 19.00% by weight chromium, approximately 10.00% by weight nickel, approximately 1.00% by weight magnanese, approximately 0.50% by weight silicon, approximately 0.025% by weight carbon, and the balance essentially iron, the improvement which comprises:
absorbing said sulfur trioxide in sulfuric acid having a concentration of greater than 98% and less than 101% and a temperature greater than 120° C., thereby generating the heat of absorption; and
removing said heat of absorption from said sulfuric acid in useful form through heat exchange with another fluid in said heat exchanger comprising said heat transfer means, and thereby heating said another fluid to a temperature of greater than 120° C.

24. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, said heat exchanger comprising means for transfer of heat from said sulfuric acid to said another fluid, said means being constituted of an alloy which comprises between about 19% and about 28% by weight chromium, up to about 10% by weight nickel, up to about 4% by weight molybdenum, up to about 1.5% by weight manganese, up to about 1% by weight silicon, up to about 0.04% by weight carbon, and the balance essentially iron, the improvement which comprises:

absorbing said sulfur trioxide in sulfuric acid having a concentration of greater than 98% and less than 101% and a temperature greater than 120° C., thereby generating the heat of absorption; and removing said heat of absorption from said sulfuric acid in useful form through heat exchange with another fluid in said heat exchanger comprising said heat transfer means, and thereby heating said another fluid to a temperature of greater than 120° C.

25. In a process for the manufacture of sulfuric acid comprising passing a gas stream comprising sulfur dioxide and oxygen through a series of catalyst stages and catalytically oxidizing sulfur dioxide to sulfur trioxide in said catalyst stages, the improvement which comprises:

passing an interpass gas stream comprising sulfur trioxide through a heat recovery tower, said interpass gas stream comprising gas exiting from a catalyst stage upstream of the final catalyst stage;

contacting said interpass gas stream in said heat recovery tower with sulfuric acid having a concentration of between 98% and 101%, thereby absorbing sulfur trioxide in said sulfuric acid and generating the heat of absorption, said sulfuric acid entering said heat recovery tower at a concentration of at least 98% and a temperature of at least 120° C., and exiting said heat recovery tower at a concentration of at least 99% and a temperature of at least 120° C.;

removing the heat of absorption from said sulfuric acid in useful form through transfer of heat to another fluid in a heat exchanger, thereby heating said another fluid to a temperature greater than 120° C.; and contacting the exit gas from said heat recovery tower with sulfuric acid in another absorption tower for removal of residual sulfur trioxide from said exit gas before catalytically oxidizing sulfur dioxide contained in said exit gas to produce additional sulfur trioxide.

26. An improved process as set forth in claim 25 wherein said another absorption tower is operated with an acid inlet temperature lower than 120° C.

27. An improved process as set forth in claim 25 wherein said interpass gas stream and said sulfuric acid are passed countercurrently through said heat recovery tower.

28. A improved process as set forth in claim 25 wherein said sulfuric acid leaves said heat recovery tower in a stream having a temperature greater than 120° C., said sulfuric acid stream is passed through said heat exchanger, and at least a portion of the cooled sulfuric acid stream is recycled to said heat recovery tower.

29. An improved process as set forth in claim 28 wherein said sulfuric acid is diluted during recirculation to a strength greater than 98% and less than about 99%.

30. An improved process as set forth in claim 29 wherein dilution is effected by adding a diluent selected from the group consisting of liquid water, steam, and relatively dilute sulfuric acid to said circulating stream after heat transfer to said another fluid and before entry of said sulfuric acid into said heat recovery tower.

31. An improved process as set forth in claim 25 wherein said heat exchanger comprises means for indirect transfer of heat from said sulfuric acid to said another fluid.

32. An improved process as set forth in claim 25 wherein said another fluid comprises a liquid so it enters said heat exchanger and consists essentially of vapor as it exits said heat exchanger.

33. An improved process as set forth in claim 32 wherein said another fluid comprises water, and steam is generated in said heat exchanger.

34. An improved process as set forth in claim 32 wherein said another fluid as introduced into said heat exchanger comprises an organic liquid, and the organic vapor generated in said heat exchanger is used in an organic Rankine cycle to produce work.

35. In a process for the manufacture of sulfuric acid comprising passing a gas stream comprising sulfur dioxide and oxygen through a series of catalyst stages and catalytically oxidizing sulfur dioxide to sulfur trioxide in said catalyst stages, the improvement which comprises:

passing a final reaction gas stream comprising sulfur trioxide through a heat recovery tower, said final reaction gas stream comprising gas exiting from the final stage of said series of catalyst stages;

contacting said final reaction gas stream in said heat recovery tower with sulfuric acid having a concentration between 98% and 101%, thereby absorbing sulfur trioxide in said sulfuric acid and generating the heat of absorption, said sulfuric acid entering said heat recovery tower at a concentration of at least 98% and a temperature of at least 120° C., and exiting said heat recovery tower at a concentration of at least 99% and a temperature of at least 120° C.;

removing the heat of absorption from said sulfuric acid in useful form by transfer of heat to another fluid in a heat exchanger, thereby heating said another fluid to a temperature greater than 120° C.; and contacting the exit gas from said heat recovery tower with sulfuric acid in another absorption tower for removal of residual sulfur trioxide from said exit gas before exhausting said exit gas from the process, said another absorption tower being operated with an inlet acid temperature of approximately 80° C. or below.

36. An improved process as set forth in claim 35 wherein said final reaction gas stream and said sulfuric acid are passed countercurrently through said heat recovery tower.

37. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration between 98% and 101%, thereby absorbing sulfur trioxide in the sulfuric acid and generating the heat of absorption, the absorption being carried out in a heat recovery tower to which sulfuric acid is delivered at a concentration of at least 98% and a temperature of at least 120° C., and from which sulfuric acid is discharged at a concentration of at least 99% and a temperature greater than 120° C.;

removing the heat of absorption from said sulfuric acid in useful form through transfer of heat to another fluid in said heat exchanger and thereby heating said another fluid to a temperature greater than 120° C.; and contacting the exit gas from said heat recovery tower with sulfuric acid in another absorption tower for removal of residual sulfur trioxide from said exit gas before either exhausting said exit gas from said process or catalytically oxidizing sulfur dioxide contained therein to produce additional sulfur trioxide, said another absorption tower being operated with an exit sulfuric acid temperature lower than 120° C.

38. An improved process as forth in claim 37 wherein said gas comprising sulfur trioxide and said sulfuric acid are passed countercurrently through said heat recovery tower.

39. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery tower to which said sulfuric acid is delivered at a concentration of at least 98% and a temperature of at least 120° C., and from which said sulfuric acid is discharged at a concentration of at least 99% and a temperature greater than 120° C.; and removing the heat of absorption from said sulfuric acid in useful form through transfer of heat to another fluid in said heat exchanger and thereby heating said another fluid to a temperature greater than 120° C., the temperature of said sulfuric acid being greater than 120° C. and the concentration of said sulfuric acid being at least 99% throughout its passage through said heat exchanger, said heat exchanger comprising means for transfer of heat from said sulfuric acid to another fluid, said means comprising an alloy selected from the group consisting of ferrous alloys containing chromium, iron/nickel alloys containing chromium, and nickel-base alloys containing chromium, said alloy having a corrosion rate of not greater than about 0.16 mm per year in 99% sulfuric acid at 143° C.

40. An improved process as set forth in claim 39 wherein said sulfuric acid leaves said tower in a stream having a temperature greater than 120° C., said sulfuric acid stream is passed through said heat exchanger, and at least a portion of the cooled sulfuric acid stream is recycled to said tower.

41. An improved process as set forth in claim 40 wherein said sulfuric acid is diluted during recirculation to a strength greater than 98% and less than about 99%.

42. An improved process as set forth in claim 41 wherein dilution is effected by adding a diluent selected from the group consisting of liquid water, steam, and relatively dilute sulfuric acid to said circulating stream after heat transfer to said another fluid and before entry of said sulfuric acid into said tower.

43. An improved process as set forth in claim 39 wherein said heat transfer means comprises means for indirect transfer of heat from said sulfuric acid to said another fluid.

44. An improved process as set forth in claim 39 wherein said another fluid as introduced into said heat exchanger comprises a liquid, and transfer of heat to said another fluid results in vaporization of said another fluid so that said another fluid comprises a vapor as it exits said heat exchanger.

45. An improved process as set forth in claim 44 wherein said another fluid consists essentially of a vapor as it exit said heat exchanger.

46. An improved process as set forth in claim 45 wherein said another fluid comprises water, and steam is generated in said heat exchanger.

47. An improved process as set forth in claim 45 wherein said another fluid as introduced into said heat exchanger comprises an organic liquid, and the organic vapor generated in said heat exchanger is used in an organic Rankine cycle to produce work.

48. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery tower to which said sulfuric acid is delivered at a concentration of at least 98% and a temperature of least 120° C. and from which sulfuric acid is discharged at a concentration of at least 99% and a temperature greater than 120° C.;

removing the heat of absorption from said sulfuric acid in useful form through transfer heat to another fluid in said heat exchanger and thereby heating said another fluid to a temperature greater than 120° C., said sulfuric acid having a temperature greater than 120° C. and a concentration of at least 99% throughout the course of heat transfer to said another fluid; and contacting the exit gas from said heat recovery tower with sulfuric acid in another absorption tower for removal of residual sulfur trioxide from said exit gas before either exhausting said gas from the process or catalytically oxidizing sulfuric acid contained therein to produce additional sulfur trioxide, the temperature of the sulfuric acid at the inlet of said another absorption tower being at least about 40° C. lower than the inlet temperature of the sulfuric acid to the heat recovery tower.

49. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery tower to which said sulfuric acid is delivered at concentration of at least 98% and a temperature of at least 120° C., and from which said sulfuric acid is discharged at a concentration of at least 99% and a temperature of greater than 120° C.;

removing said heat of absorption from said sulfuric acid in useful form by transfer of heat to another fluid in said heat exchanger, thereby heating said another fluid to a temperature of greater than 120° C., said sulfuric acid having a temperature of greater than 120° C. and a concentration of at least 99% throughout the course of heat transfer to said another fluid, said another fluid as introduced into said heat exchanger comprising a liquid, and transfer of heat to said another fluid resulting in vaporization of said another fluid so that said another fluid comprises a vapor as its exits said exchanger; and contacting the exit gas from said heat recovery tower with sulfuric acid in another absorption tower for removal of residual sulfur trioxide from said exit gas before either exhausting said exit from said process or catalytically oxidizing sulfur dioxide contained therein to produce additional sulfur trioxide.

* * * * *